United States Patent
Maetz et al.

(10) Patent No.: US 9,229,699 B2
(45) Date of Patent: Jan. 5, 2016

(54) METHOD, SYSTEM AND DEVICE FOR EXECUTION OF A SOFTWARE APPLICATION

(75) Inventors: Yves Maetz, Melesse (FR); Marc Eluard, Acigne (FR)

(73) Assignee: Thomson Licensing (FR)

( * ) Notice: Subject to any disclaimer, the term of this patent is extended or adjusted under 35 U.S.C. 154(b) by 250 days.

(21) Appl. No.: 13/522,695

(22) PCT Filed: Jan. 17, 2011

(86) PCT No.: PCT/EP2011/050527
§ 371 (c)(1),
(2), (4) Date: Jul. 17, 2012

(87) PCT Pub. No.: WO2011/086180
PCT Pub. Date: Jul. 21, 2011

(65) Prior Publication Data
US 2012/0297022 A1    Nov. 22, 2012

(30) Foreign Application Priority Data

Jan. 18, 2010 (EP) .................................... 10305054

(51) Int. Cl.
*G06F 15/16* (2006.01)
*G06F 9/445* (2006.01)

(52) U.S. Cl.
CPC ........................................ *G06F 8/60* (2013.01)

(58) Field of Classification Search
CPC ....................................................... G06F 8/60
USPC ......... 709/217, 202, 220, 203, 219, 223, 224, 709/226, 227, 228, 229
See application file for complete search history.

(56) References Cited

U.S. PATENT DOCUMENTS

| | | |
|---|---|---|
| 7,155,490 B1 | 12/2006 | Malmer et al. |
| 7,802,246 B1 * | 9/2010 | Kennedy et al. .............. 717/173 |

(Continued)

FOREIGN PATENT DOCUMENTS

| | | |
|---|---|---|
| CA | 2547630 | 6/2005 |
| CN | 1648863 | 8/2005 |

(Continued)

OTHER PUBLICATIONS

Microsoft Corporation, "Deploying Microsoft Software Update Services", Internet Citation, Mar. 5, 2007, pp. 1-96.

(Continued)

*Primary Examiner* — Quang N Nguyen
(74) *Attorney, Agent, or Firm* — Jack Schwartz & Associates, PLLC

(57) ABSTRACT

A method of executing a software application. A storage device stores connection data, an identifier of the software application, a context selector, and an application launcher. An execution device connects, using the connection data, to a server. The storage device transfers the context selector to the execution device, which executes it to generate a first context for the execution device. The identifier and the first context are sent to the server from which the storage device receives the software application, which is stored with the first context. The application launcher is transferred to the execution device for execution. A second context of the execution device is generated and the storage device checks if it matches the first context. If so, the storage device transfers the software application to the execution device where it is executed.

12 Claims, 3 Drawing Sheets

(56) References Cited

U.S. PATENT DOCUMENTS

| | | | |
|---|---|---|---|
| 2002/0091720 A1* | 7/2002 | Liu et al. | 707/203 |
| 2005/0015498 A1 | 1/2005 | Okazawa et al. | |
| 2005/0132349 A1 | 6/2005 | Roberts et al. | |
| 2005/0240919 A1* | 10/2005 | Kim et al. | 717/168 |
| 2005/0289536 A1 | 12/2005 | Nayak et al. | |
| 2006/0075486 A1 | 4/2006 | Lin et al. | |
| 2006/0161892 A1 | 7/2006 | Anand et al. | |
| 2006/0218549 A1 | 9/2006 | Hsu et al. | |
| 2007/0033652 A1 | 2/2007 | Sherwani et al. | |
| 2007/0094654 A1* | 4/2007 | Costea | 717/168 |
| 2007/0118617 A1 | 5/2007 | Lee et al. | |
| 2007/0233842 A1 | 10/2007 | Roberts et al. | |
| 2008/0046708 A1 | 2/2008 | Fitzgerald et al. | |
| 2008/0250476 A1 | 10/2008 | Myers et al. | |
| 2010/0131084 A1* | 5/2010 | Van Camp | 700/86 |
| 2011/0154135 A1* | 6/2011 | Tyhurst et al. | 714/57 |

FOREIGN PATENT DOCUMENTS

| | | |
|---|---|---|
| EP | 1672490 | 6/2006 |
| EP | 1832976 | 9/2007 |
| GB | 205751 | 10/1923 |
| JP | 2003122581 | 4/2003 |
| JP | 2009238155 | 10/2009 |
| JP | 2010152878 | 7/2010 |
| WO | WO0058855 | 10/2000 |
| WO | WO2008/154426 | 12/2008 |

OTHER PUBLICATIONS

Pawlak, "Software Update Service to East Patch Distribution", Internet Citation Nov. 12, 2008, pp. 1-6.

Search Report Dated May 26, 2011.

* cited by examiner

METHOD, SYSTEM AND DEVICE FOR EXECUTION OF A SOFTWARE APPLICATION

This application claims the benefit, under 35 U.S.C. §365 of International Application PCT/EP2011/050527, filed Jan. 17, 2011, which was published in accordance with PCT Article 21(2) on Jul. 21, 2011 in English and which claims the benefit of European patent application No. 10305054.8, filed on Jan. 18, 2010.

TECHNICAL FIELD

The present invention relates generally to software, and in particular to software distribution.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

There are of course many existing ways of distributing software, usually based on having the user select the desired version (depending on the operating system) and then either downloading the software or installing it from a DVD, a USB key or the like. A first variant is to download an exact software image onto the target computer, but this causes problems if there is the slightest difference between the configuration of the target computer and the configuration for which the software image is intended. A second variant is to run an installation program that either requests the user to enter manually the configuration of the target computer or to have the installation program do this automatically. This second variant results in a software image that is an exact match for the target computer.

Various bells and whistles to the basic schemes are provided in for example US 2008/0046708, WO 2008/154426, US 2006/0218549, US 2006/075486 and US 2008/250476 without changing the essentials thereof.

A drawback with these solutions is that they are fairly inflexible. It can therefore be appreciated that there is a need for a more flexible solution for software installation. This invention provides such a solution.

SUMMARY OF INVENTION

In a first aspect, the invention is directed to a method of downloading a first software application in a system comprising a first device adapted to execute the first software application, the first device being connected to a second device that stores an identifier of the first software application. The second device obtains first configuration information for the first device; sends the identifier and the first configuration information to the first device for transmission to a server; receives the first software application from the server, the software application corresponding to the identifier and to the first configuration information; and transfers the software application to the first device.

In a first preferred embodiment, the second device verifies, prior to transferring the first software application, that second configuration information for the first device matches the first configuration information; the first software application is transferred only in case of positive verification. It is advantageous that the second configuration information is received from the first device.

In a second preferred embodiment, the first configuration information is obtained by transferring a configuration selection application to the first device; and receiving the first configuration information from the first device having executed the configuration selection application to generate the first configuration information for the first device.

In a third preferred embodiment, the second device stores the first configuration information and the software application.

In a fourth preferred embodiment, the second device sends to the first device connection data for connection to the server.

In a second aspect, the invention is directed to a first device in a system for executing a first software application. The system further comprises a second device adapted to execute the first software application. The first device is adapted to be connected to the second device. The first device comprises memory for storing an identifier of the first software application; and a processor adapted to obtain first configuration information for the second device; send the identifier and the first configuration information to the second device for transmission to a server; receive the first software application from the server, the first software application corresponding to the identifier and to the first configuration information; and transfer the first software application to the second device.

In a first preferred embodiment, the processor is further adapted to verify that second configuration information for the first device matches the first configuration information; and wherein the transfer is performed only in case of positive verification. It is advantageous that the processor is further adapted to receive the second configuration information from the second device.

In a second preferred embodiment, the processor is adapted to obtain the first configuration information by transferring a configuration selection application to the second device; and receiving the first configuration information from the second device having executed the configuration selection application to generate the first configuration information for the second device.

In a third preferred embodiment, the memory is further for storing the first configuration information and the software application.

In a fourth preferred embodiment, the processor is further adapted to send to the second device connection data for connection to the server.

BRIEF DESCRIPTION OF DRAWINGS

Preferred features of the present invention will now be described, by way of non-limiting example, with reference to the accompanying drawings, in which.

DESCRIPTION OF EMBODIMENTS

Figure 1:
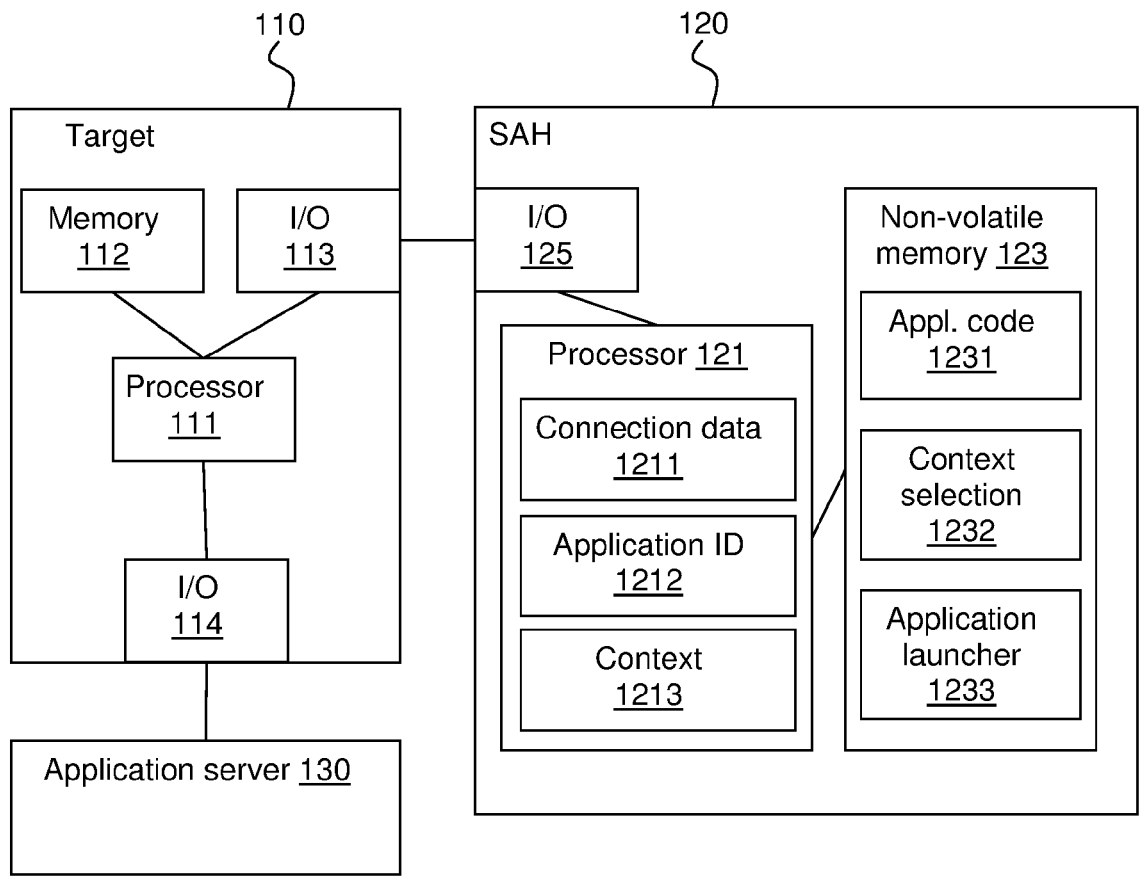
FIG. 1 illustrates a system according to a preferred embodiment of the invention.

FIG. 1 illustrates an exemplary system 100 implementing the invention. The system 100 comprises a target 110, a self-optimized application holder (hereinafter SAH) 120, and an application server 130.

The target 110 can be practically any kind of computer or device capable of performing calculations, such as a standard Personal Computer (PC). The target 110 comprises a processor 111, RAM memory 112, a first interface 113 for communication with the SAH 120, and a second interface 114 for communication with the application server 130. The communication with the application server 130 is advantageously performed via the Internet.

The SAH 120 comprises an interface 125 for releasable connection to and communication with the target 110, a processor 121 and non-volatile memory 123. The processor 121 is among other things adapted to store connection data 1211, an identifier for an application 1212 and a context of the target 110. The connection data 1211 comprises information necessary to establish a connection with the application server 130, such as the address of the server and, preferably, data permitting (mutual) authentication. This will be described in more detail hereinafter. A context is information concerning a hardware configuration, a software configuration or a hardware and software configuration. The non-volatile memory 123 is adapted to store application code 1231, a context selection application 1232 and an application launcher 1233, which also will be described further hereinafter.

In a preferred embodiment, the SAH 120 is implemented as a secure USB key wherein the non-volatile memory 123 is a flash memory, the processor 121 is a tamper-resistant processor, and the interface 125 is a USB interface (which naturally means that the first interface 113 of the target 110 also is a USB interface).

The application server 130 may be any kind of suitable server that is capable of communication with the target 110. The server 130 may host a single software application or a plurality of different software applications.

The present invention differs from the prior art in that a user does not buy an application directly. Instead, the user buys a unique SAH that does not store the code for the application, but generic applications and information that enables download from the application server, as will be seen hereinafter.

Figure 2:
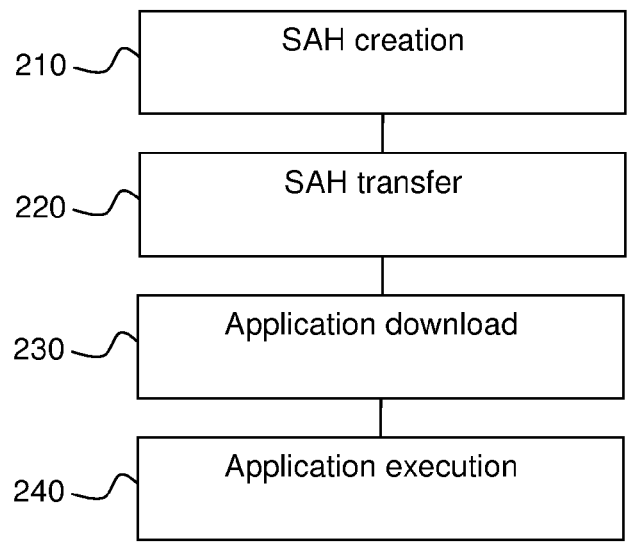
FIG. 2 illustrates a flowchart describing the main steps of the software distribution method according to a preferred embodiment of the present invention.

FIG. 2 is a flowchart that describes the four main steps of the software distribution method according to a preferred embodiment of the present invention. Each of the four steps is described in more detail hereinafter. At first, the SAH for a specific software application is created, step 210. This is followed by transfer of the SAH, step 220, usually when the SAH is bought by a user. The software application is then downloaded, step 230, and executed, step 240.

Figure 3:
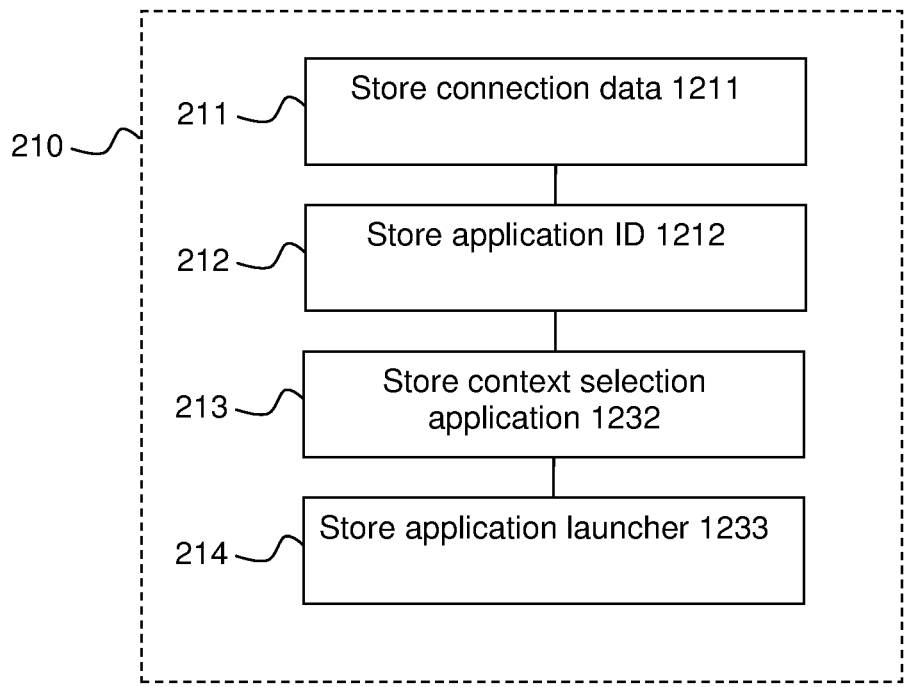
FIGS. 3-5 illustrate in greater detail main steps of the software distribution method according to a preferred embodiment of the present invention.

FIG. 3 illustrates the SAH creation step 210 of the method illustrated in FIG. 2. The steps in FIG. 3 are preferably performed during manufacture of the SAH. The connection data 1211 is stored in the processor 121, step 211. The communication data 1211 will be used for communication with the server 130. The application identifier 1212 is also stored in the processor 121, step 212. Then the context selection application 1232 and the application launcher 1233 are stored in the non-volatile memory 123, steps 213 and 214 respectively. It will be appreciated that these steps may be performed in practically any order.

During the SAH transfer step 220, the SAH 120 is provided to a user, usually in exchange for some kind of payment.

Figure 4:
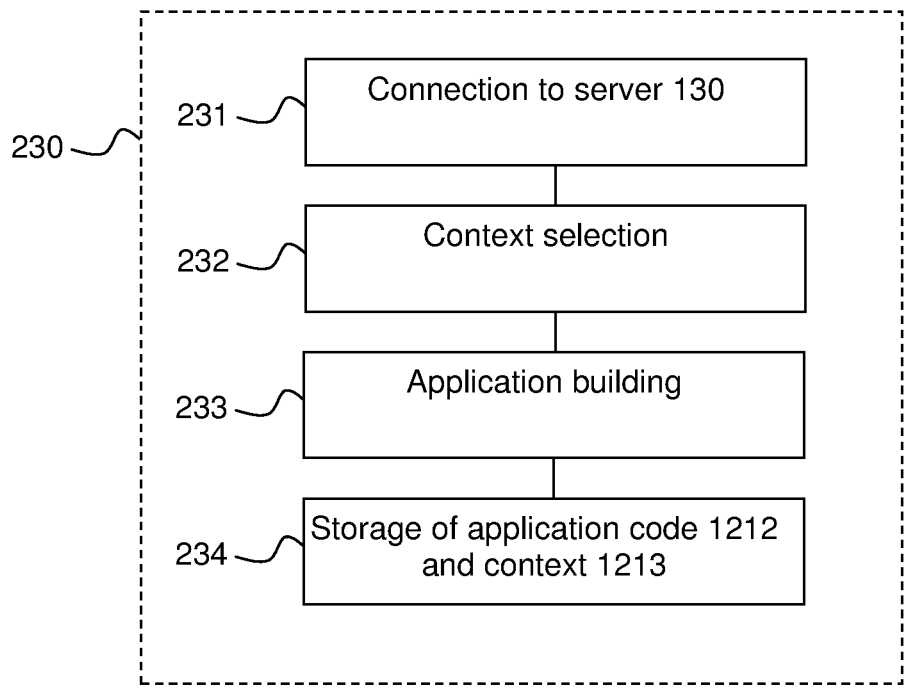

FIG. 4 illustrates the application download step 230 of the method illustrated in FIG. 2. This step may be performed in three cases: 1) the SAH 120 stores no application code 1231 (this is the case illustrated in FIG. 2), 2) a new version of the application code—patches, upgrades, add-ons, etc.—is available, and 3) the context has changed, for example if the target has changed or if the SAH 120 has been connected to a different target.

In step 231, the SAH 120 uses the connection data 1211 to connect to the server 130, via the target 110, step 231. The SAH 120 provides the context selection application 1232 to the target 110 that launches this application. The context selection application 1232 then either automatically detects the context of the target 110 or requests the user to select the context, step 232. The context is the relevant hardware and software configuration of the target, such as for example characteristics of the operating system and the graphic card. This may for example be performed as described in US 2008/0046708. While automatic context detection is convenient, manual input by the user enables the user to select the context of a target that is different from the computer to which the SAH 120 is connected. The context 1213 is then sent to the SAH 120 that stores it in the processor 121 and to the server 130, which uses the received context to either select an already existing version of the software application, if such a version exists, or to build the version of the software application that is optimised for the target 110. This software application 1231 is then sent to the SAH 120 where it is stored in the non-volatile memory 123 and the context 1213 is stored in the processor 121, step 234. The SAH 120 also receives from the server 130 a version identifier for the software application. This version identifier may e.g., depending on the implementation, be stored as a subfield of the application identifier 1212 or the context 1213, or be stored separately, for instance in the header of the application code 1231.

In a preferred embodiment, to connect to the server 130, the SAH 120 also uses the data permitting authentication, which allows the server 130 to verify the authenticity of the SAH 120 and also allows integrity and confidentiality of transmitted data.

It is preferred that if an error is detected by the SAH, it enters an error state that lasts until the next connection to a target. This is to ensure the atomicity of the method. Naturally, other error management policies may also be used, but they are out of the scope of the present invention.

Figure 5:
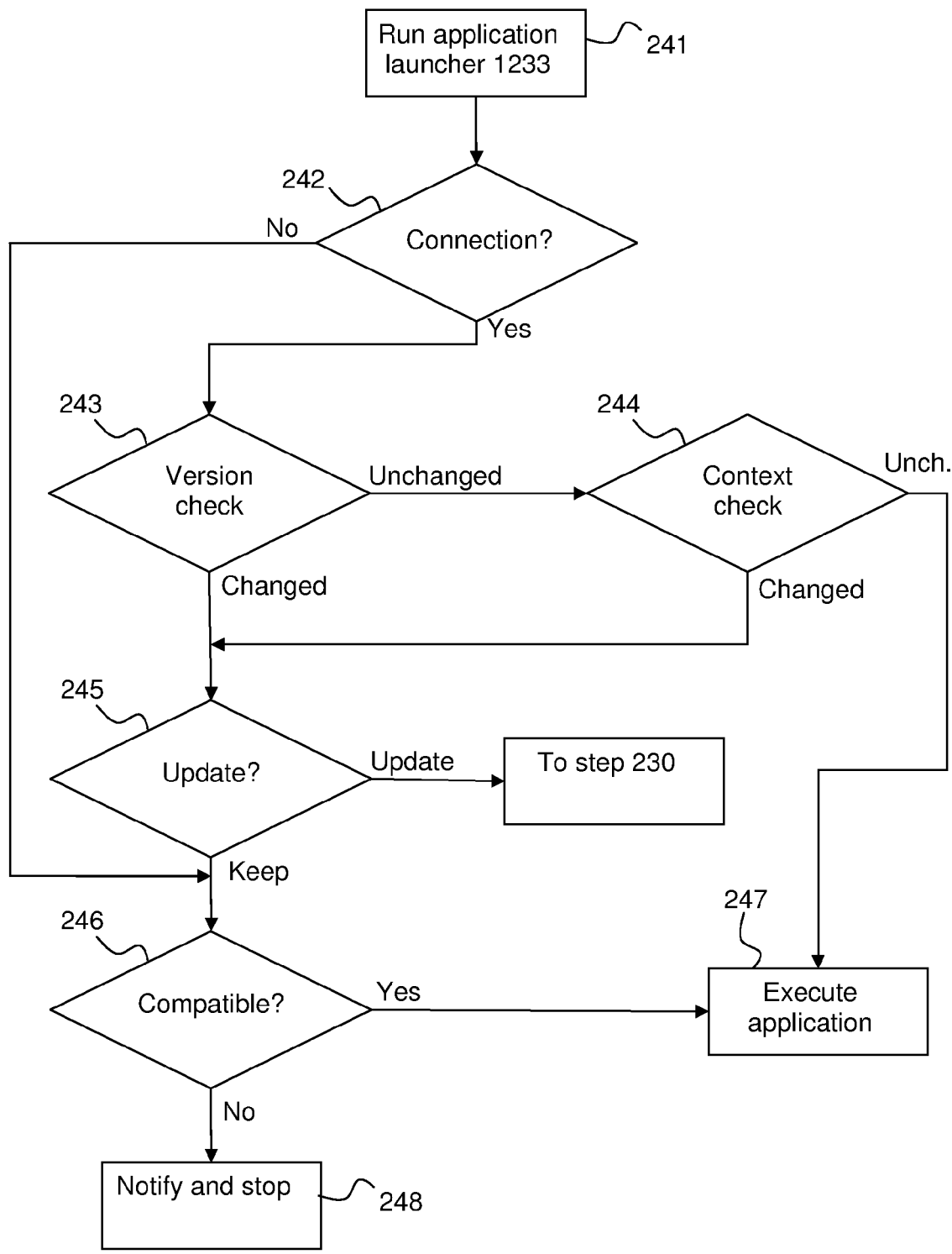

FIG. 5 illustrates the application execution step 240 of the method illustrated in FIG. 2. This step may be performed directly after completion of step 230 or when a SAH 120 that stores application code 1231 is connected to a computer.

First, the application launcher 1233 is provided to the target 110 where it is executed, step 241. A main task of the application launcher 1233 is to verify that the software application 1231 may be executed by the target 110. It is then verified, step 242, if the application launcher 1233 has a connection with the server 130. If this is not the case, then the method moves to compatibility verification step 246 described hereinafter. However, if there is a connection, the application launcher checks, step 243, using the application identifier 1212, if the version of the software application 1231 stored in the SAH 120 is the latest version, i.e. if the version provided by the server has changed when compared to the stored one. If the versions are the same, i.e. there is nothing new to download, then the method moves on to step 244 in which the context is checked. This step is also performed in case it is detected in step 242 that no connection exists.

The context check, step 244, verifies if the context of the target 110 (preferably calculated automatically as in step 232) matches the context 1213 stored in the processor 121 (i.e. if the contexts are identical or, depending on the implementation, if the context of the target is compatible with the stored context). It is for example possible that an application is particularly suited for a family of processors, in which case the application is compatible with these processors. If this is the case, i.e. if the contexts match, then the software application is uploaded from the non-volatile memory 123 and executed, step 247.

However, if there is no match, then the context has changed or is incompatible. This may be the case if the target 110 has changed hardware or software, or if the SAH 120 is connected to a different computer than the one for which the context was selected. It is preferred that it is indicated to the user that the context has changed and that an update may be in order. Upon reception of the input from the user, step 245, the method may move in two directions. If the user wants the update, then the method moves to step 230 and performs the necessary substeps. But if the user does not want to update the software application, or if such an update cannot be performed for example owing to the lack of a connection to the server, then it is verified, step 246, if the version of the software application is compatible with the context.

If the software version is compatible with the context, then the method executes the software application, step 247. On the other hand, if the software version is incompatible with the context, then this is indicated to the user and the method stops, step 248.

In a preferred embodiment, the SAH 120 implements the anti-theft mechanism described in WO 2008/129009. The anti-theft mechanism uses a RFID chip that can be in one of two states. In the first state, the RFID chip can interact with anti-theft portals and in addition the RFID chip refuses to provide information necessary for full use of the support to which it is attached. The RFID chip moves to the second state when the support is bought, i.e. when it is put in contact with a state-change device. In the second state, the RFID no longer interacts with anti-theft portals and it also provides the necessary information. An advantage is that the support does not work even if it stolen. As applied to the SAH, the RFID could for example securely store the connection data 1211 and the application identifier 1212; without these, the SAH will, at least in theory, not work.

It will be appreciated that the place of storage in the SAH, i.e. in the processor or in the non-volatile memory, is the preferred solution, but that this location may be altered depending on the implementation. It will also be appreciated that the present invention can provide a way of distributing software that is more flexible than prior art solutions.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A method of downloading a first software application for a first device adapted to execute the first software application, the first device being connected to a second device, the second device storing an identifier of the first software application, the method comprising, at a processor of the second device:
sending the identifier and a first configuration information obtained for the first device to a server via the first device, the second device being unable to directly contact the server;
receiving the first software application from the server, via the first device, said first software application corresponding to the identifier and to the first configuration information, the second device being unable to execute the first software application; and
transferring the first software application to the first device for execution;
wherein, prior to the transferring, verifying that a second configuration information received from the first device matches the first configuration information and transferring is performed only in case of positive verification; and
wherein the first configuration information is obtained by transferring a configuration selection application to the first device and receiving the first configuration information from the first device having executed the configuration selection application to generate the first configuration information for the first device.

2. The method of claim 1, further comprising storing the first configuration information and the first software application.

3. The method of claim 1, further comprising sending to the first device connection data for connection to the server.

4. A device for obtaining a first software application for execution by a first device, the first device being connected to the device, the device comprising:
memory for storing an identifier of the first software application; and
a processor that:
obtains a first configuration information for the first device;
sends the identifier and the first configuration information obtained for the first device to the first device for transmission to a server;
receives the first software application from the server via the first device, the first software application corresponding to the identifier and to the first configuration information; and
transfers the first software application to the first device for execution, wherein said device is unable to contact the server directly, and unable to execute the first software application;
wherein, prior to the transferring, the processor further verifies that a second configuration information received from the first device matching the first configuration information and the transferring is performed only in case of positive verification; and
wherein the processor obtains the first configuration information by transferring a configuration selection application to the first device and receiving the first configuration information from the first device having executed the configuration selection application to generate the first configuration information of the first device.

5. The device of claim 4, wherein the memory stores the first configuration information and the first software application.

6. The device of claim 4, wherein the processor provides connection data to the first device for connection to the server.

7. A method of downloading a first software application in a system for execution by a first device, the first device being connected to both a second device and a server, the second device storing an identifier of the first software application, the second device being unable to contact the server directly and unable to execute the first software application, the method comprising, at a processor of the first device:
sending a first configuration information of the first device to the second device;
receiving the identifier and the first configuration information from the second device;
transmitting the identifier and the first configuration information to the server for transmission of the first software application to the second device via the first device, said first software application corresponding to the identifier and to the first configuration information;

receiving the first software application from the second device; and executing the first software application;

wherein the first device stores a second configuration information for the first device and only receives the first software application from the second device when the second device verifies the second configuration information received from the first device matching the first configuration information;

wherein the first configuration information sent to the second device is obtained by receiving a configuration selection application from the second device and executing the configuration selection application to generate the first configuration information for the first device.

8. The method of claim 7, further comprising receiving connection data for connection to the server from the second device.

9. A first device for executing a first software application, the first device being connected to both a second device and a server, the second device being unable to contact the server directly and unable to execute the first software application, the first device comprising:

memory for storing configuration information for the first device; and a processor that:

generates first configuration information for the first device and send the first configuration information to the second device;

receives an identifier of the first software application and the first configuration information from the second device;

transmits the identifier and the first configuration information to the server for transmission of the first software application to the second device via the first device, the first software application corresponding to the identifier and to the first configuration information;

receives the first software application from the second device; and executes the first software application;

wherein the memory stores a second configuration information for the first device and the processor only receives the first software application from the second device when the second device verifies the second configuration information received from the first device matching the first configuration information;

wherein the processor generates the first configuration information by receiving a configuration selection application from the second device and executing the configuration selection application to generate the first configuration information for the first device.

10. The first device of claim 9, wherein the processor receives connection data from the second device for connection to the server.

11. A server for providing first application software to a first device for execution, the first device being connected to a second device and the first device communicating directly with the server, the second device being unable to contact the server directly and unable to execute the first software application, the server comprising a processor that:

receives a first configuration information for the first device and an identifier of the first software application from the first device, wherein the first device generates the first configuration information by receiving a configuration selection application from the second device and executing the configuration selection application to generate the first configuration information for the first device; and sends the first software application corresponding to the identifier and to the first configuration information via the first device to the second device for verification before the second device transmits the first software application to the first device for execution by the first device;

wherein the first device only receives the first software application from the second device when the second device verifies a second configuration information previously received from the first device matching the first configuration information.

12. A method of providing a first software application to a system comprising a first device adapted to execute the first software application, the first device being connected to a second device, the first device communicating directly with a server, the method comprising, the second device being unable to contact the server directly and unable to execute the first software application, at a processor of the server:

receiving a first configuration information for the first device and an identifier of the first software application from the first device, wherein the first device generates the first configuration information by receiving a configuration selection application from the second device and executing the configuration selection application to generate the first configuration information for the first device; and sending the first software application corresponding to the software identifier and to the first configuration information via the first device to the second device for verification before the second device transmits the first software application to the first device for execution by the first device;

wherein the first device only receives the first software application from the second device when the second device verifies a second configuration information previously received from the first device matching the first configuration information.

* * * * *